United States Patent [19]

Larkin et al.

[11] Patent Number: 5,236,792
[45] Date of Patent: Aug. 17, 1993

[54] BATTERIES AND COMPONENTS

[75] Inventors: John J. Larkin, Long Valley; Michael J. Riordan, Bethleham Township, Hunterdon County, both of N.J.

[73] Assignee: AT&T Bell Laboratories, Murray Hill, N.J.

[21] Appl. No.: 751,889

[22] Filed: Aug. 29, 1991

[51] Int. Cl.$^5$ ............................................. H01M 2/10
[52] U.S. Cl. ................................... 429/121; 429/187
[58] Field of Search ................. 429/65, 121, 178, 187

[56] References Cited

U.S. PATENT DOCUMENTS

| | | | |
|---|---|---|---|
| 2,671,819 | 3/1954 | Field | 429/65 |
| 3,910,800 | 10/1975 | Groby et al. | 429/187 X |
| 4,317,497 | 3/1982 | Alt et al. | |
| 4,637,965 | 1/1987 | Davis | 429/178 X |
| 4,857,422 | 8/1989 | Stocchiero | 429/187 X |
| 4,957,829 | 9/1990 | Holl | |
| 5,015,543 | 5/1991 | English | 429/65 |

FOREIGN PATENT DOCUMENTS

| | | |
|---|---|---|
| 0054579 | 12/1980 | European Pat. Off. |
| 0158368 | 4/1985 | European Pat. Off. |
| 1129193 | 8/1960 | Fed. Rep. of Germany |
| 1174859 | 11/1961 | Fed. Rep. of Germany |

OTHER PUBLICATIONS

"Battery Compartments", by K. K. Fujitsu, *Patent Abstracts of Japan*, No. JP-A-60 236 454, Nov. 25, 1985.
"A Rack Mounted Complete DC Power System", by R. New and B. A. Wittey, *IEEE Proceedings*, pp. 270–276, 1982.
"Incorporating the New Battery into the Telephone Plant", by H. J. Luer *Bell System Technical Journal*, vol. 49, No. 7 pp. 1447–1470. Sep. 1970.

*Primary Examiner*—Stephen Kalafut
*Attorney, Agent, or Firm*—Ruloff F. Kip

[57] ABSTRACT

The top of a lead-acid cell electric battery is closed by a plastic closure plate having hingedly coupled thereto a pivotable attachment angularly movable about a horizontal pivot axis through a range of angular position between upright and folded down positions at opposite ends of the range. The attachment consists primarily of a planar plastic board having a cut-out therein. When upright, the board is usable as a handle to lift the battery. When in folded-down position the board overlies the battery terminals, and sections of cable conductors connected to such terminals, to protect the overlain elements. Further, the board is received in a recess in the plate so that the board's upper surface is coplanar and horizontal with the plate's upper surface to the board's rear. Those two surfaces are adapted to share the load of an overlying battery. The described battery further includes strain relief means for the mentioned sections, and it has to its rear a trough which is alignable with the troughs of other similar batteries in a row-column array thereof to form a conduit through the array for cables connected to respective batteries therein.

4 Claims, 4 Drawing Sheets

BATTERIES AND COMPONENTS

FIELD OF THE INVENTION

This invention relates generally to electric batteries and, more particularly, to improvements in such batteries and in components used as closures for the tops of such batteries.

BACKGROUND OF THE INVENTION

U.S. Pat. No. 4,957,829, issued Sep. 18, 1990, in the name of Joel T. Holl for "Modular Battery Plant System Assembly Comprising Multiple Unit Cell Modules," and assigned to the assignee hereof, discloses assemblages of electric batteries in which the batteries are joined in one or more rows, and in which each row of batteries is topped by a single elongated unperforated cover extending for the full length of the row and completely overlying the tops of all the batteries to cover all of the battery terminals so as to prevent access thereto from above. Such arrangement has the disadvantage that, if access is needed to the terminals of only one battery in the row, such access can be gained only be removing such row cover to thereby unnecessarily expose to access the terminals of all the batteries in the row. Further disadvantages are that access to the terminals of a row of batteries can be obtained only by completely removing the cover from the batteries, and that it is not possible to stack rows of batteries in a tier such that the weight of the batteries in an upper row will be transmitted to those in a lower row in a way such that the cover which overlies the terminals of the batteries in the lower row does not have to bear all of such weight.

SUMMARY OF THE INVENTION

One or more of the above-described disadvantages or other disadvantages may be overcome according to the invention hereof by an improvement in apparatus comprising a horizontal insulative plate for closing the top of an electric battery and two spaced metallic terminal components carried by such plate and adapted for use as part or all of terminals for such battery when such plate is incorporated therein. Such improvement comprises an insulative pivotable attachment hingedly coupled to said plate to be angularly movable relative thereto around a pivot axis through a range of angular positions between upright and folded-down positions therefor at opposite ends of said range, the attachment in folded-down position covering only part of the top of the plate so as to permit another part of such plate to be directly contacted by an overlying battery or other object for purposes of directly transmitting at least part of the weight of such object to the lower battery through such other part of such plate. According to one aspect of the invention, the attachment when in upright position is adapted to serve as a handle for lifting an electric battery into which such plate has been incorporated. According to other aspects of the invention, the attachment when in folded-down position may overlie and protect from access the terminals of only that battery, may be adapted to bear part of the weight of such object and may have an extent in the horizontal dimensions which is confined to the outline in such dimensions of the circumference of that plate, whereby the attachment does not inconveniently "stick out" from the plate.

BRIEF DESCRIPTION OF THE DRAWING

For a better understanding of the invention, reference is made to the following description of a representative embodiment thereof, and to the accompanying drawings wherein.

DETAILED DESCRIPTION

Figure 1:
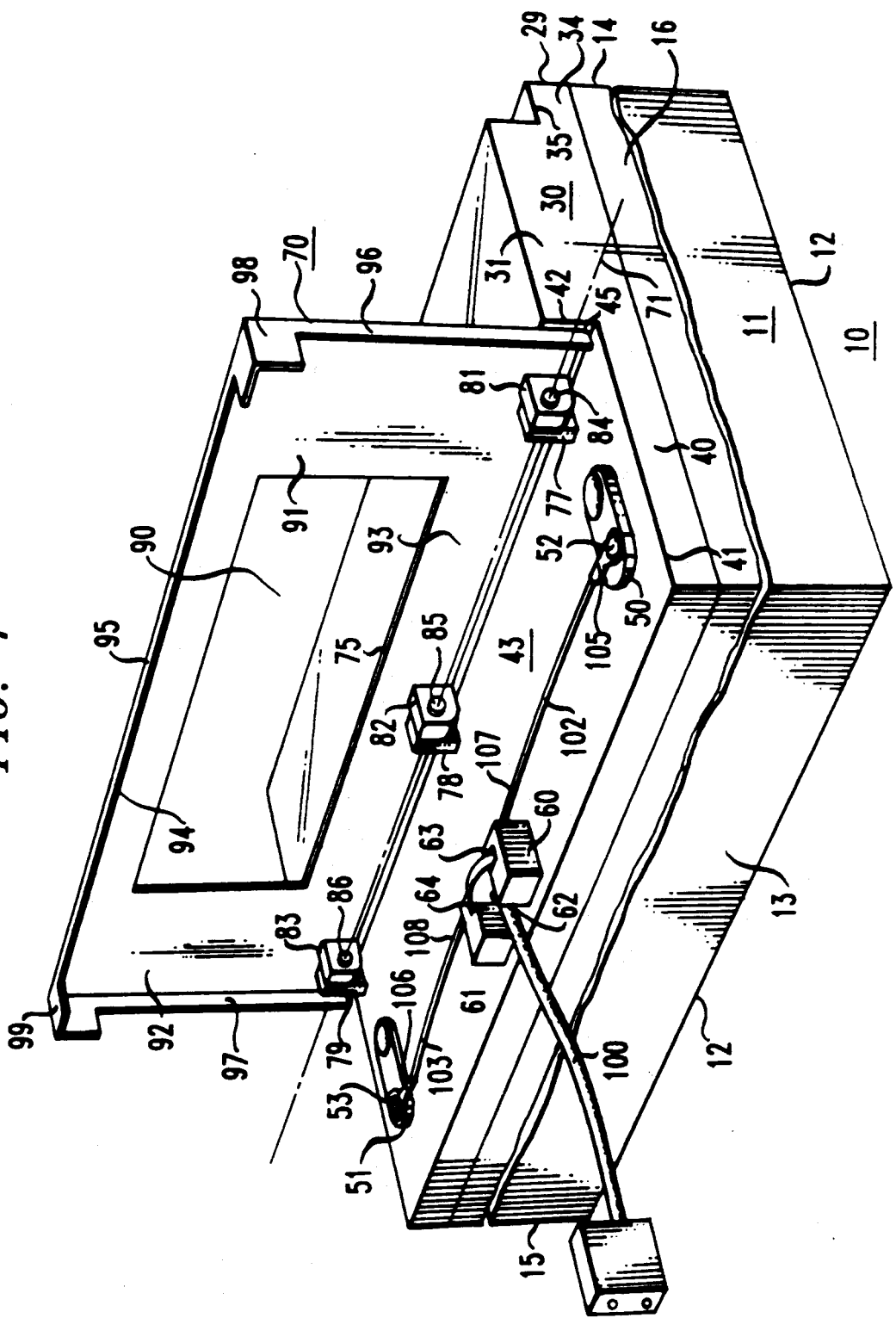
FIG. 1 is an isometric view, partly broken away, of an electric battery constituting an exemplary embodiment of the invention and including a top closure plate having an attachment shown in FIG. 1 as being in upright position.
Figure 2:
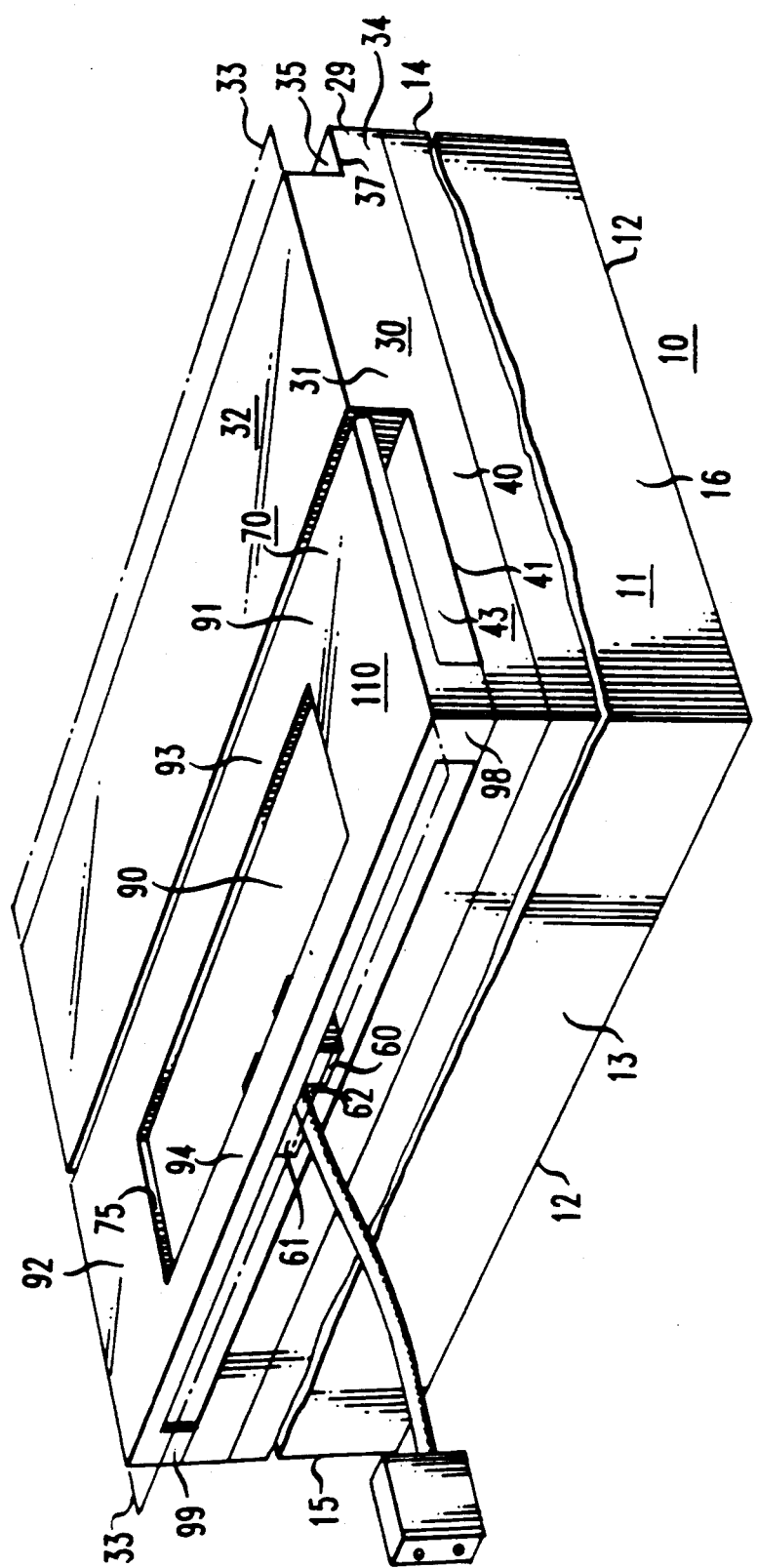
FIG. 2 is an isometric view of the FIG. 1 battery with such attachment being in folded-down position.
Figure 3:
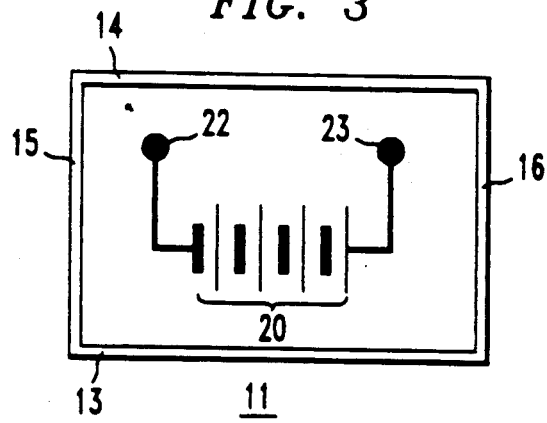
FIG. 3 is a schematic plan view of the container of the FIG. 1 battery.

Referring now to FIGS. 1-3, the reference numeral 10 designates an electric battery comprising an insulative container 11 for the cells of the battery. The container is a plastic molded article constituted of epoxy resin or other suitable synthetic resinous material. The battery 10 depicted in the figure is a lead-acid cell battery although the invention is not limited to batteries of such kind.

The container 11 has a bottom 12 and four vertical walls upstanding from the batteries and consisting of (FIG. 3) laterally spaced front and rear walls 13 and 14, and longitudinally spaced left and right-hand side walls 15 and 16. When container 11 is standing alone, it has an open top.

The container 11 serves (FIG. 3) as a receptacle for electrochemical means 20 usable for generating electricity and in the form of an array in the container of lead-acid cells 21. The cells 21 are electrically connected in series between two longitudinally spaced upwardly-extending metallic posts 22, 23 adapted to be incorporated at their tops into terminals for battery 10 as will be later described.

Another component of battery 10 is (FIGS. 1 and 2) an insulative horizontal top closure plate 30 which, when battery 10 is assembled, extends longitudinally and laterally across the top of container 11 to close it. Plate 30 is a plastic molded article composed of a suitable synthetic resinous material which may be the same as or different from that of container 20. In the course of fabricating battery 10, plate 30 is joined to container 11 by thermally bonding the bottom circumferential margin of the plate to the top circumferential margin of the container to fuse together the respective plastic materials of those two articles. The plate thus becomes a permanent part of the battery.

Figure 4:
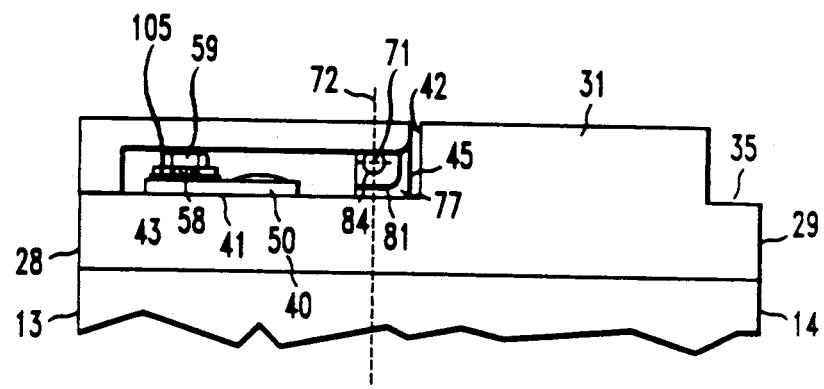
FIG. 4 is a right side elevation, broken away, of the upper part of the FIG. 1 battery as isometrically depicted in FIG. 2.

The plate 30 has a front side 28 (FIG. 4) and a rear side 29 laterally spaced from each other.

As well shown by FIGS. 1 and 2, the plate 30 has a multilevel top which is stepped in the lateral direction to divide the plate into laterally spaced sections of different height. The majority of the horizontal area of plate 30 is occupied by a higher rectangular section 31 which can be aptly described as a raised platform, and which is primarily rearwardly located on the plate 30. Section 31 can be also considered an unrecessed part of the plate. The upper planar surface 32 of platform 31 lies in a horizontal plane 33 (FIG. 2) and is the highest part of the top of the plate. Surface 32 is adapted to act as a load bearing surface as will be later described.

The plate 30 has, to the rear of platform 31, a lower section 34 disposed below and bounding the underside of a notch 35 formed in the plate's rear side 29 at its top by a shoulder 37 extending into the plate. Notch 35 is of "L" cross-section in lateral-vertical planes passing through the plate. Because of its "L" cross-section, the notch is accessible both from above and to the rear of the plate. The notch 35 extends longitudinally entirely across the plate for a purpose later explained.

Moreover, plate 30 has, to the front of platform 31, another lower section 40 referred to herein as a recessed or shelf part of the plate. The shelf 40 is formed by a shoulder 41 extending from the front side 28 of the plate laterally inward to a point at which the top of the plate undergoes a vertical rise 42 from the upper surface 43 of the shelf to the upper surface 32 of the platform 31. As shown by FIGS. 1 and 2, that shelf upper surface 43 is horizontal and planar and extends longitudinally entirely across the plate. It follows that surface 43 has a flat contour in cross-section in longitudinal-vertical planes passing through the plate.

The shoulder 41 and the rise 42 bound the bottom and the rear, respectively, of a recess 45 defined by those elements and formed in plate 30 to the front of platform 31. Such recess is of "L" cross-section in lateral-vertical planes through plate 30. The shoulders 37 and 41 which respectively bound the bottoms of notch 35 and of recess 45 are at substantially the same height so that the vertical extent of the notch substantially overlaps in the vertical dimension with the vertical extent of the recess.

The shelf 40 has molded therein two metallic longitudinally-spaced inserts 50 and 51 (FIG. 1) at respective locations on the shelf which are laterally set back from front edge 28 but are near thereto. These inserts constitute respective components of two metallic terminals 52, 53 present (FIG. 1) in the completed battery 10 and adapted to supply electricity generated by electrochemical means 20 to a load external to the battery. Since terminals 52 and 53 are duplicates of each other, only the right-hand insert 50 and terminal 52 will be described herein in detail.

Figure 5:
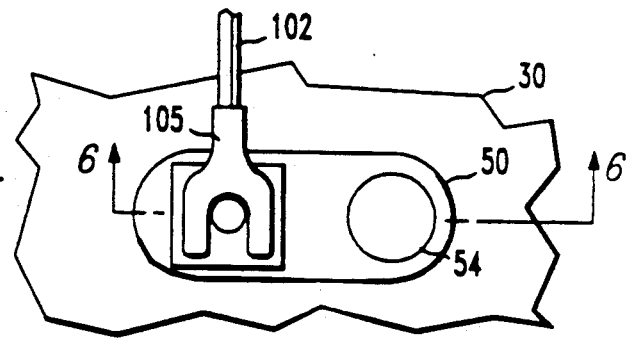
FIG. 5 is an enlarged plan view of details of the right-hand terminal of the FIG. 1 battery and of a broken away portion, surrounding that terminal, of the mentioned plate, the FIG. 5 view being partly in cross-section as indicated by the arrows 5—5 in FIG. 6; surrounding that terminal.
Figure 6:
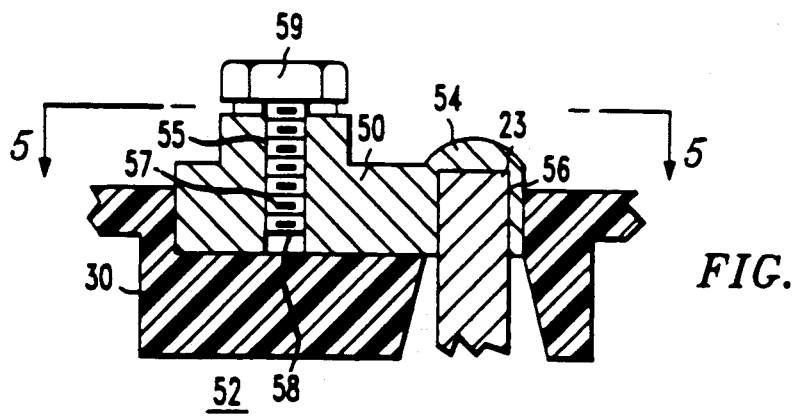
FIG. 6 is a cross section, taken as indicated by the arrows 6—6 in FIG. 1 and FIG. 5, of the terminal and plate portion depicted in FIG. 5.

Referring to FIGS. 5 and 6, the insert 50 is a flat-lying metallic piece embedded in the insulative material of plate 30 and providing for terminal 52 a base through which the terminal is united with plate 30. The insert 50 has formed therein two vertical holes 55 and 56 respectively disposed laterally frontward and rearward relative to each other, the front hole 55 being smaller in diameter than the rear hole 56. Hole 55 is a threaded hole and has received therein the threaded shank 57 of a terminal screw 58 having an enlarged head 59 spaced above base 50. The larger rear hole 56 has received therein the top of the aforementioned metal post 23 upstanding (FIG. 3) in container 11 and electrically coupled to one end of the serial connection of lead-acid cells 21. The post 23 is so welded to the terminal base 50 during manufacture of battery 10 at a time after plate 30 has been placed on container 11 to close it. The welding together of the base and post produces a slight dome 54 of metal over the tops of post 22 and hole 56.

The foregoing description of the structure of terminal 52 applies mutatis mutandis to the structure of terminal 53.

Disposed longitudinally midway between terminals 52 and 53 are (FIGS. 1 and 2) a pair of stands 60 and 61 projecting up from shelf 40 and longitudinally spaced from each other by a gap 62 providing between the stands a passage extending laterally inward from their fronts to their rears. Within the lateral extent of such passage, the stands 60, 61 have formed therein respective niches 63, 64 laterally registering with each other and longitudinally extending from such passage into stands 60, 61 to lie crosswise to lateral gap 62.

Considering now another important constituent of battery 10, the plate 30 has a pivotable attachment 70 hingedly coupled at its inner part to the plate 30 to be angularly movable about a pivot axis 71 (FIG. 2) through a range of angular positions relative to the plate, between upright (FIG. 1) and folded-down positions (FIG. 2) at opposite ends of that range. The pivot axis 71 is longitudinally and horizontally aligned, is laterally disposed somewhat forward of platform 31 to lie over the rear part of shelf 40 and is at a height intermediate of the top surfaces of such platform and shelf. That axis lies in a vertical plane 72 which substantially or exactly passes through the center of gravity for the battery.

While attachment 70 may take various forms, in the exemplary embodiment hereof it is a plastic molded synthetic resinous article of which a major component is a planar longitudinally-extending insulative board 75. Attachment 70 is coupled to plate 30 as follows.

The plate includes three longitudinally and horizontally aligned and spaced lower hinge blocks 77, 78 and 79 (FIG. 1) disposed closer to the rear than to the front of shelf 40 and upwardly salient from the shelf surface 43. Those three blocks have formed therein respective pin-receptacle bores (not shown) which are coaxial with axis 71 and extend into the blocks from the right-hand sides thereof. Such three lower blocks are matched by three longitudinally and horizontally aligned upper hinge blocks 81, 82, 83 disposed in spaced relation from, but near to, the inner margin of board 75 and downwardly salient from the bottom planar surface of that board. The upper blocks are relatively disposed so that their respective left-hand faces are spaced from each other by the same distances as those separating the right-hand faces of the corresponding lower blocks 77, 78, 79. Moreover, the upper blocks carry respective longitudinally and horizontally aligned hinge pins 84, 85, 86 extending from right to left entirely through blocks 81, 82, and 83, respectively, so as to have respective salient portions extending leftward from the left faces of these blocks. These pins are of diameters to have a friction fit in the bores formed in the lower hinge blocks 77, 78, 79. By appropriately positioning and adjusting attachment 70 relative to plate 30, the salient portions of the three pins 84, 85, 86 are introduced and forced into the three respectively corresponding bores in the lower hinge blocks 77, 78 and 79 until the left-hand faces of the upper blocks come close to or into contact with the right-hand faces of the lower blocks, and the attachment 70 is thereby assembled in a hingedly coupled manner with plate 30. If desired, the mentioned pins may be locked within the bores of the lower blocks in a conventional manner as, say, by having the free ends of the pins project leftwardly beyond the left-hand faces of blocks 77, 78, 79, making these free ends threaded, and screwing holding nuts into those threaded free ends.

The friction fit between the mentioned pins and boxes constitutes a means for yieldably maintaining attachment 70 in its upright position or in its folded-down position (or in any other position therefor within the mentioned range) once the attachment has reached that position. To have such a position holding means for the attachment is evidently an advantage.

It is contemplated that the attachment 70 and plate 30 may be hingedly coupled together by hinge means other than that described above. Thus, for example, such coupling may be effected by pairs of lower and of upper hinge blocks in which convex, spherical surface "ball" projections formed in one set of blocks are adapted by a snap action to be received and frictionally fit in concave spherical surface "socket" recesses formed in the other set of blocks to thereby provide the requisite hinge.

The board 75 of attachment 70 has aperturing formed therein in the shape of a rectangular cut out 90 passing through the board. Aperture 90 divides the expanse of board 75 into two flaps 91 and 92 at longitudinally opposite ends of the aperture, a central board section 93 laterally inward of the aperture and an outer central section 94 disposed between the aperture and the outer margin of board 75 and providing a bridge between the flaps 91 and 92.

The board at its outer margin and left and right hand side margins carries stiffening flanges 95, 96, and 97 (FIG. 1) normal to the board and salient therefrom in the downward direction when attachment is in its folded down position. These flanges at the longitudinally opposite outer corners of the board are further extended normal thereto to form at those corners a pair of feet 98, 99 projecting from the board and having a purpose later explained.

USE OF THE EMBODIMENT

After battery 10 has been fabricated so that the plate 10 and its attachment 70 have been united with container 11 and the cells 21 therein, battery terminals 52 and 53 have been formed, and the battery is otherwise complete, it will be necessary for it to be transported. To aid such transportation, attachment 70 is moved to its FIG. 1 position at which it is upright, and the attachment is yieldably held in that position by the friction between the pins and the bore walls of the described hinged coupling between plate 30 and the attachment. With attachment 70 being so upright, a person desiring to transport the battery passes his/her fingers through aperture 90 in board 75 and wraps them around the bridge 94 provided by the board 75 so as to use the bridge as a hand grip. The battery can then be easily lifted by that person, using attachment 70 as a handle.

Figure 9:
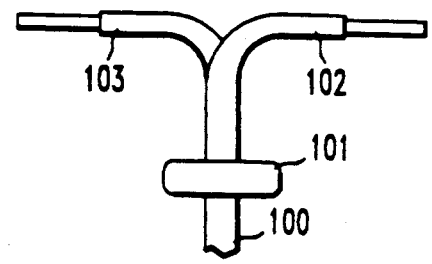
FIG. 9 is a fragmentary plan view of part of a conductor cable usable with the FIG. 1 battery.

Assume now that the battery has been transported to the site at which it is to be installed. Assume further that attachment 70 is upright to expose terminals 52, 53 and stands 60, 61 to access. To the end of permitting the battery to supply electricity, there is provided at that site a cable 100 (FIG. 9) comprising two superposed insulated electrical conductors 102 and 103 and carrying a plastic strain relief disc 101 affixed to the cable by being molded into its insulation. The cable is passed through the strain relief means comprising stands 60, 61 by lowering the cable into the gap 62 between those stands so that diametrically opposite sides of the disc 101 are received in opposite ones of the niches 63, 64 in those stands. The cable is, thus, in effect led laterally inward through gap 62. Once the cable has so passed inward beyond the niches 63, 64, it is split into its separate conductors 102, 103 which are warped around the rear sides of the stand and then led in opposite directions to the battery terminals 52, 53 to be connected thereto by "U" terminal lugs 105, 106 attached to the free ends of the conductors. If, thereafter, a pulling force is exerted on cable 100 outward of stands 60, 61, the sections 107, 108 of the conductors 102, 103 between terminals 52, 53 and strain relief disc 101 are isolated from that force both by the warping of such conductors around the rear sides of the stands and by the interposition between such force and such sections of 107, 108 the disc 101 which counterbalances such outward force by inward force exerted on the disc by the stands. Battery 10 thus has the advantage of providing built-in strain relief means for electrical conductors connected thereto.

An advantage of having such built-in means provided by stands 61, 62 with or without disc 101 is that the lengths of cable 100 or its conductors 102, 103 over which pulling force, might separate the conductor terminal lugs 105, 106 from the battery terminals 52, 53 are lengths limited to the short conductor sections 107, 108. The likelihood of disruption of the connection of cable 100 (or of either of its conductors) to battery 10 is thus minimized.

Once cable 100 has been connected as described to battery 10, attachment 70 is angularly moved counter-clockwise (FIG. 1) around pivot axis 71 to the end of folding it down and getting it out of the way. Such angular movement is first yieldably resisted by the friction between the pins and the bore walls of the hinged coupling, and, then, is altogether stopped by the occurrence of contact between parts respective to the attachment 70 and the plate 30. To wit, such movement is arrested by, on the one hand, the coming into contact of the tops of blocks 77-79 and of stands 60, 61 with the underside of board 75 and, on the other hand, the coming into contact of the feet 98, 99 of the attachment 70 with the upper surface 43 of the shelf 40 of plate 30. Seven stop elements 60, 61, 77, 78, 79 and 98, 99 are thus employed to arrest such movement. While that number of stop elements may seem large, it is desirable to have that many to provide well distributed support from beneath for attachment 70 because the latter may be required to bear a substantial load (as will soon be described) but, in the absence of such multiplicity of stop elements, its strength to do so might be unduly weakened by, for example, the presence in the attachment of the large aperture 90. Note in this connection that the positioning of stop elements 60, 61 and 98, 99 at or near the outer margin of board 75 does much to compensate for any weakness otherwise introduced by aperture 90 into the structure of board 75 in its use as a beam for supporting a heavy load.

When the movement of attachment 70 is thus stopped, it has reached its folded down position. When in that position, and even when there is no load thereon, the attachment performs the useful function that the flap portions 91, 92 of its board 75 overlie (FIG. 2) the battery terminals 52, 53 to protect them from being mechanically damaged or electrically faulted by inadvertent contact with extraneous objects. Similarly, the board 75 helps to protect the cable sections 107, 108 on shelf 40 from being injured by contact with extraneous objects too large to pass through the aperture 90 in the board, or from being gripped in a manner which subjects those sections to pulling force.

The attachment 70 is of such size and shape that for any angular position it can assume by movement about pivot axis 71, the extent of the attachment in the longitudinal and lateral dimensions of battery is confined to the outline in such dimensions of the circumference of plate 30, i.e., the circumference in the those dimensions of the battery 10 itself. That is, attachment 70 affords the advantage that, however, it may be angularly moved about axes 71 it does not "stick out" beyond the outline of the horizontal circumference of the battery.

It will be noted that when attachment 70 is in its folded down position determined by the mentioned stop elements on the attachment and plate 30, the attachment is received in the recess 45 above shelf 40 as far as attachment can be set down in such recess. When so fully received in recess 45, the attachment 70 at its top is at most at the level of the top of the unrecessed part 31 of plate 30.

From the description so far given, it will be evident that attachment affords the advantage of performing dual functions in that, when in upright position, it serves as a handle for battery 10 and, when in folded down position, it uncovers the platform 31 of plate 30 and does not project above the top of that platform so as to permit platform 31 to be directly contacted by, and bear load from, another battery or other heavy object superimposed on battery 10.

Another major advantage of having battery 10 incorporate the attachment 70 is that such attachment is adapted, when in folded down position to serve as a load bearing member supplementing the load bearing capacity of the platform 31 of the plate 30. Specifically, when attachment 70 is so in folded down position to be supported from beneath in a distributed manner by the mentioned stop elements, the attachment has an upper surface 110 (FIG. 2) which is a planar surface lying in the same horizontal plane 33 as does the upper planar surface 32 of the platform 31 provided by plate 30. The attachment and that platform are thus adapted to bear a common load having a bottom defining a horizontal plane. An advantage among other of having the capability of using both the attachment and the platform to support such a load is that it greatly improves the stability of the stacking of the object providing the load on top of battery 10 in instances where the size and shape of the bottom of that object does not match with, and is greater than, the size and shape of the top area of platform 31.

Figure 7:
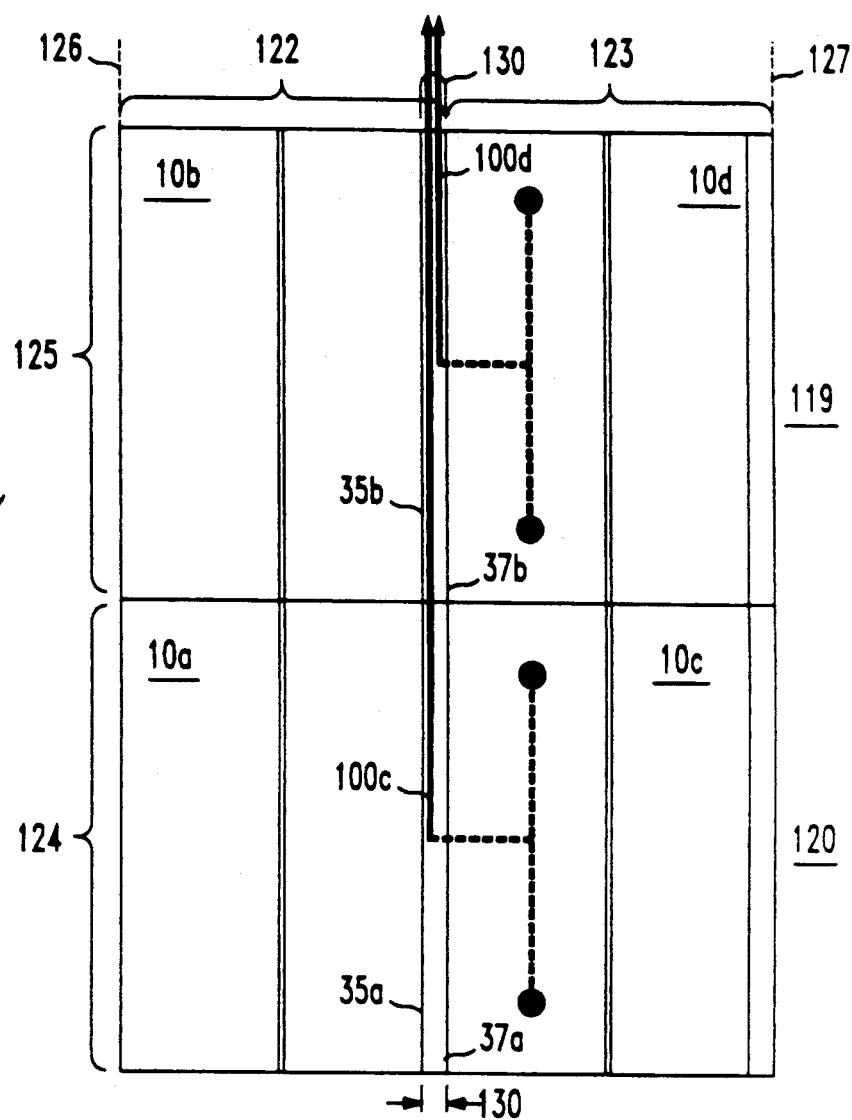
FIG. 7 is a plan view of part of an assemblage of electrical batteries all the same in structure, dimensioning and character as the FIG. 1 battery.
Figure 8:
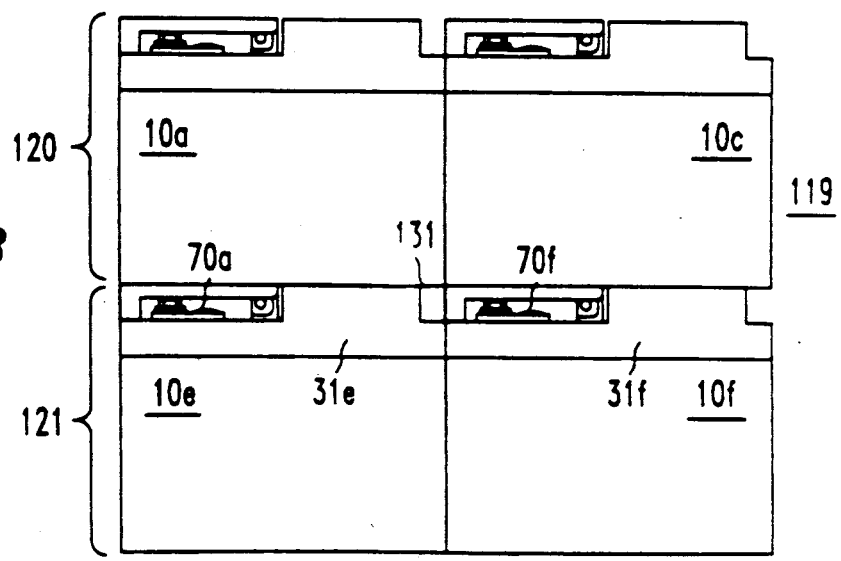
FIG. 8 is a front elevation of the FIG. 7 assemblage.

FIGS. 7 and 8 show a collection of batteries similar to battery 10 and in which there is brought into play the enhancement of the load bearing capacity of that battery by the use of attachment 70 as a load bearing member. In FIGS. 7 and 8, the reference numbers having alphabetical suffixes designate elements which are counterparts of those elements designated by the same reference numerals without suffixes in FIGS. 1-6 and 9.

Considering FIGS. 7 and 8 in detail, what is shown thereby are duplicate batteries arranged in a three dimensional assemblage 119 consisting of an upper tier 120 of batteries bearing on and directly supported by batteries in a lower battery tier 121 of the same configuration as the upper battery tier 120. The upper tier 120 constitutes an array of two longitudinal rows 122, 123 of batteries and of two lateral columns 124, 125 of batteries. While rows 122, 123 are shown as each including only two batteries these rows are, as indicated by dash lines 126, 127, often extended in practice to include as many as eight batteries each.

The upper battery tier 120 consists of batteries 10$a$, 10$b$ in row 122 and batteries 10$c$, 10$d$ in row 123. The lower battery tier 121 consists of batteries 10$e$, 10$f$, in respective rows directly beneath rows 122, 123, and two other batteries (not shown) directly behind (FIG. 8) the batteries 10$e$ and 10$f$.

As best shown by FIG. 7, the respective notches 35$a$, 35$b$ of the batteries 10$a$, 10$b$ in row 122 are substantially colinear so that these notches at the interface of row 122 with row 123 together from a conduit 130 extending longitudinally entirely through the array of batteries constituting tier 120. The conduit 130 is utilized for routing the cables 100$c$, 100$d$ connected to batteries 10$c$, 10$d$ from the inside of the array to the outside thereof. Since these cables are vertically positioned just above the upper surfaces of the shelves of batteries 10$c$, 10$d$ and since these upper surfaces are at approximately the same height of the upward facing surfaces 37$a$, 37$b$ bounding the bottoms of the notches 35$a$, 35$b$, the cables 100$c$ and 100$d$ are well disposed vertically to be run through conduit 130. Conduit 130 is open at its top because it is formed in the top tier of batteries. In the case, however of conduit 131 which (FIG. 8) is found at the interface of the two vertically superimposed battery tiers 120 and 121, the conduit is roofed over so as to be in the form of a tunnel passing longitudinally all the way through the battery assemblage.

As depicted in FIG. 8, the battery 10$c$ is vertically aligned with battery 10$f$ and rests upon it so that battery 10$f$ bears the full load of battery 10$c$. That load, however, is common to and shared by the platform 31$f$ and attachment 70$f$ of the battery 10$f$, and such platform and attachment together provide a load bearing area which is substantially coextensive with the bottom area of battery 10$c$. The use of both of elements 31$f$ and 70$f$ to bear the load of battery 10$c$ yields the advantages that the pressure on the top of the underlying battery is minimized, and the battery 10$c$ has greater stability in its stacking relation with battery 10$f$ than if the load of battery 10$c$ were to be borne by, solely platform 31$f$ or attachment 70$f$. The same advantages are of course realized by every other set of vertically stacked batteries in assemblage 119 (as, for example, the batteries 10$a$ and 10$e$). Also, such advantages will be realized if the number of batteries in such a vertically stacked set thereof is increased from the two batteries shown in FIGS. 7 and 8 to three or more batteries as a result of adding one or more extra tiers of batteries to the assemblage 119.

The above described embodiments being exemplary only, it is to be understood that additions thereto, omissions therefrom and modifications thereof can be made without departing from the invention. For example without restriction, it is within the invention in its broader aspect to have attachment 70 hingedly coupled to some part of the battery other than its top closure plate.

Accordingly, the invention is not be considered as limited save as is consonant with the recitals of the following claims.

We claim:

1. An electric battery comprising an insulative container having a bottom, walls and an open top, a horizontal insulative plate coupled to said container and extending longitudinally and laterally across said top to close it, said plate having a multilevel top stepped in the lateral direction whereby said plate comprises an unrecessed part in the form of a rearward higher platform and a part above which a recess is formed and comprising a shelf extending rearward from the front of said plate, the top of said shelf being below the top of said platform, and said plate having formed therein a rise joining said platform and shelf, a pair of metallic terminals nearer to the front of said plate than to the rear side thereof and projecting up from said shelf at longitudinally opposite ends thereof and adapted to be detachably connected to two electrical conductors respective thereto, an insulative pivotable attachment hingedly coupled to said plate to be angularly movable relative thereto around a pivot axis through a range of angular positions for said attachment between an upright position therefor and a folded down position for said attachment at which said attachment is received in said recess to overlie and protect said terminals, a pair of projections extending down from said attachment when folded down and disposed at its extreme away from said axis, said attachment when folded down being stopped from further angular movement towards said plate by contact occurring between said projections and said shelf, and said projections bounding longitudinally opposite ends of a space providing between said shelf and said attachment when folded down a longitudinally centrally located opening for inward access to said shelf, and strain relief means mounted between said terminals and on said shelf within the longitudinal extent of, and rearward of, said opening to be accessible to said conductors when aligned to pass through said opening, said strain relief means being capable, when coupled with said conductors, of isolating portions of said two electrical conductors when they are respectively connected to said terminals from pulling force exerted on such conductors outward of said strain relief means.

2. An electric battery according to claim 1, in which said strain relief means comprises a pair of strands projecting up from said shelf and spaced from each other by a gap through which said conductors may be led laterally rearward and then bent at substantially right angles in opposite directions to respectively extend longitudinally to said terminals.

3. An electric battery according to claim 2 in which said stands serve as stops for said attachment when it reaches said folded down position.

4. An electric battery according to claim 2 in which said stands have respective niches formed therein opposite each other across said gap and extending into said stands from said gap, said niches being adapted to receive and hold thereon opposite sides of a plastic strain relief disc molded into the insulation of a cable incorporating said two conductors.

* * * * *